United States Patent [19]

Flint

[11] 4,101,808

[45] Jul. 18, 1978

[54] LAMP CONTROL CIRCUIT

[75] Inventor: John R. Flint, Barrington, Ill.

[73] Assignee: Bell & Howell Company, Chicago, Ill.

[21] Appl. No.: 617,270

[22] Filed: Sep. 30, 1975

[51] Int. Cl.² .......................................... H05B 39/04
[52] U.S. Cl. ................................... 315/151; 250/205; 315/158; 315/307; 323/21
[58] Field of Search ............... 315/149, 151, 152, 157, 315/158, 159, 10, 291, 307, 311; 250/205; 323/21

[56] References Cited

U.S. PATENT DOCUMENTS

| | | | |
|---|---|---|---|
| 2,779,897 | 1/1957 | Ellis | 323/21 X |
| 2,796,530 | 6/1957 | Phillips et al. | 250/205 |
| 3,377,507 | 4/1968 | Riebs | 315/159 |
| 3,431,464 | 3/1969 | Brischnik | 315/158 |
| 3,437,822 | 8/1969 | Fitzsimmons | 250/205 |
| 3,456,154 | 7/1969 | Spiteri | 315/151 |
| 3,456,155 | 7/1969 | Buchanan | 250/205 |
| 3,473,084 | 10/1969 | Dodge | 250/205 |
| 3,582,661 | 6/1971 | Pijis | 250/205 |
| 3,639,768 | 2/1972 | Mancini | 315/151 |
| 3,670,202 | 6/1972 | Paine et al. | 250/205 |
| 3,694,692 | 9/1972 | Pressman | 315/149 |
| 3,952,242 | 4/1976 | Ukai | 315/158 X |

OTHER PUBLICATIONS

Phototransistor Regulates Illumination Intensity, Electronics, Oct. 4, 1965, p. 101.
Control and Regulation System for Photocell Sensing Device, IBM Technical Disclosure Bulletin, vol. 7, No. 9, Feb. 1965.

*Primary Examiner*—Eugene R. LaRoche
*Attorney, Agent, or Firm*—Harry G. Thibault; Alan B. Samlan

[57] ABSTRACT

The disclosure relates to a lamp control circuit for maintaining the light output intensity of an incandescent lamp or banks of lamps constant. The lamp control circuit comprises a pair of input terminals adapted for connection to an illumination power source having one of the input terminals coupled to one side of the incandescent lamp to be controlled, and switching means coupled to the other side of the controlled lamp and to the other input terminal so that when the switching means is closed the illuminating power from the power source is applied to the controlled lamp and when the switch is open the illuminating power to the controlled lamp is terminated. The lamp control circuit additionally includes an illumination power sampling means which includes a second incandescent lamp which is coupled between the one input terminal and the switching means for sampling the illumination power and converting the sampled illumination power to light energy having an intensity related to the amount of the illuminating power received by the controlled lamp. A light sensitive detector is associated with the second incandescent lamp and is coupled to the switching means for controlling the switching means closed and open time durations responsive to the second incandescent lamp light intensity to render the light output intensity of the controlled lamp substantially constant.

10 Claims, 2 Drawing Figures

LAMP CONTROL CIRCUIT

BACKGROUND OF THE INVENTION

The present invention is generally directed to a lamp control circuit for maintaining the light output intensity of an incandescent lamp or banks of lamps to be controlled constant. The present invention is more specifically directed to a lamp control circuit for regulating the light output intensity of the illuminating incandescent lamps of fiche readers and document recorders.

There are many environments in which it is desirable and often necessary to maintain the light output intensity of illuminating incandescent lamps constant. Such environments include fiche readers wherein an incandescent lamp is utilized for projecting individual fiche film frame images onto a projection screen for reading purposes and document recorders wherein banks of incandescent lamps project illuminating light onto an exposure area in which area a series of documents are transported and recorded on film by a scanning camera. In the fiche reader environment it is desirable to maintain the light output intensity of the illuminating incandescent lamp constant notwithstanding varying power supply voltages so that the fiche images can be easily read. In the document recorder environment it is absolutely essential that the light output intensity of the illuminating incandescent lamp banks be constant as a document is recorded to assure even exposure of the document.

Prior art systems for accomplishing this end have generally included switching type regulators wherein a pulsating DC voltage is switched on and off by a suitable switching device and then filtered using inductance-capacitance combinations. The switching regulators normally include a free running oscillator having a variable duty cycle wherein the duty cycle controls the magnitude of the power supply voltage and wherein the duty cycle is controlled in turn by a feedback voltage arrangement. While such systems have proven generally successful the necessary inductance-capacitance combinations are rather bulky and heavy rendering such systems unsuitable for portable use. Additionally, the inductance-capacitance arrangements are not capable of integrating the illumination energy in the exact same manner as the controlled incandescent lamps rendering such prior art systems not totally reliable.

It is therefore a general object of the present invention to provide a new and improved lamp control circuit for maintaining the light output intensity of an incandescent lamp to be controlled constant.

It is a further object of the present invention to provide a lamp control circuit which maintains the light output intensity of an incandescent lamp constant and which does not require the inductance-capacitance arrangements previously required for such applications.

It is a still further object of the present invention to provide a lamp control circuit which affords improved lamp intensity control over those of the prior art.

SUMMARY OF THE INVENTION

The invention provides a lamp control circuit for maintaining the light output intensity of an incandescent lamp to be controlled constant comprising a pair of input terminals adapted for connection to an illumination power souce, one of the input terminals being coupled to one side of the incandescent lamp to be controlled, switching means coupled to the other side of the controlled lamp and to the other input terminal so that when the switching means is closed the illuminating power from the power source is applied to the control lamp and when the switch is open the illuminating power to the controlled lamp is terminated. The lamp control circuit of the present invention additionally comprises illuminating power sampling means comprising a second incandescent lamp coupled between the one input terminal and the switching means for sampling the illumination power and converting the sampled illumination power to light energy giving an intensity related to the amount of illuminating power received by the controlled lamp and a light sensitive detector associated with the second incandescent lamp and coupled to the switching means for controlling the switching means closed and open timed durations responsive to the second incandescent lamp light intensity to render the light output intensity of the controlled lamp substantially constant.

The present invention also provides a lamp control circuit for maintaining the light output intensity of an incandescent lamp to be controlled constant comprising a pair of input terminals adapted for connection to an illumination power source, one of the input terminals being coupled to one side of the incandescent lamp to be controlled, switching means coupled to the other side of the controlled lamp and to the other terminal so that when the switching means is closed the illuminating power from the power source is applied to the controlled lamp and when the switch is open the illuminating power to the controlled lamp is terminated. The lamp control circuit further comprises illumination power sampling means comprising a second incandescent lamp coupled between the one input terminal and switching means for sampling the illumination power and converting the sampled illumination power to light energy having an intensity related to the amount of illumination power received by the controlled lamp, a light sensitive detector associated with the second incandescent lamp for providing an intermediate control signal responsive to the second incandescent lamp light intensity and control means coupled between the light sensitive detector and the switching means for causing the switching means to open and close responsive to the intermediate control signal. As a result, as the second lamp light output intensity increases in response to increased illumination power, the detector and the control means cause the switching means to open and as the second lamp light output intensity decreases in response to decreased illumination power, the detector and the control means cause the switching means to close to thereby maintain the light output intensity of the controlled lamp substantially constant.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings, and in the several figures of which like reference numerals indicate identical elements and in which:

DESCRIPTION OF THE PREFERRED EMBODIMENT

Figure 1:
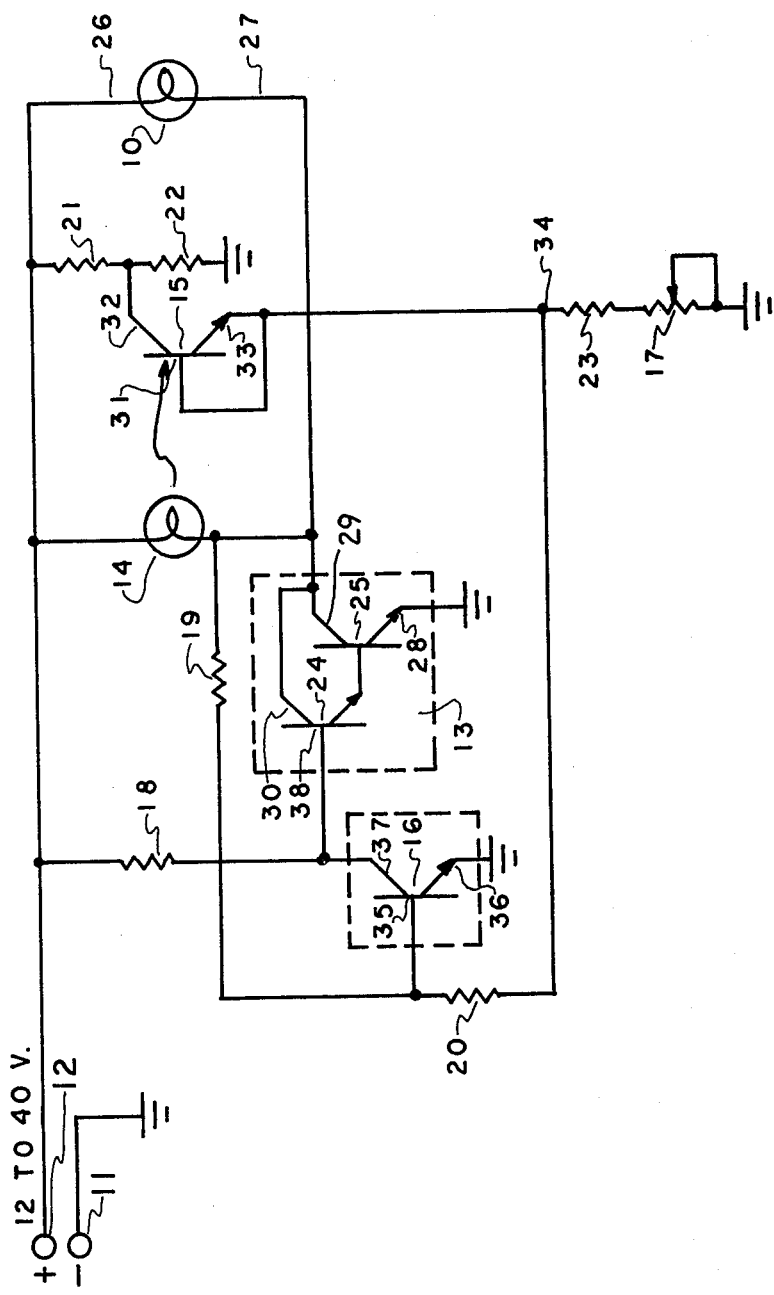
FIG. 1 is a schematic circuit diagram of a lamp control circuit embodying the present invention.

Referring now to FIG. 1, the lamp control circuit there shown is most suitable for controlling the incandescent projection lamp 10 of a fiche reader. It includes a pair of input terminals 11 and 12, switching means 13, illumination power sampling means 14, a variable resistor 17, and fixed resistors 18 through 23.

Input terminals 11 and 12 are adapted for connection to an external illumination power source. The lamp control circuit of FIG. 1 is capable of maintaining the brightness or light output intensity of lamp 10 constant notwithstanding variations of input voltages at terminals 11 and 12 ranging between 12 and 40 volts DC. One side 26 of controlled lamp 10 is coupled to input terminal 12 and the other side 27 of controlled lamp 10 is coupled to switching means 13. Switching means 13 comprises first and second transistors 24 and 25 which are interconnected in a Darlington pair configuration. Emitter 28 of the Darlington pair is grounded thus connecting the switching means to input terminal 11 which is also grounded. As a result, when the switching means closes (when the Darlington pair conducts) the illumination power is applied to controlled lamp 10 and when the switching means is open (when the Darlington pair does not conduct) the illumination power to the controlled lamp 10 is terminated.

The illumination power sampling means 14 comprises an incandescent lamp coupled between input terminal 12 and the Darlington pair switching means 13 at collectors 29 and 30 of transistors 25 and 24 respectively. Thus, the second incandescent lamp 14 is connected in parallel with controlled incandescent lamp 10 and develops a light output intensity which is directly related to the applied illumination voltage to controlled lamp 10. Also, the intensity of the light produced by incandescent lamp 14 varies in the same manner as the light output intensity of incandescent lamp 10 inasmuch as both lamps are of the incandescent type and integrate the illumination energy in the same manner.

The light sensitive detector 15 which is associated with lamp 14 comprises a phototransistor of the type well known in the art. It is arranged relative to lamp 14 so that the light produced by lamp 14 impinges upon base junction 31 to thus operatively couple the phototransistor to the lamp 14. As well known in the art, when the intensity of the light received at base 31 increases, phototransistor 15 is caused to conduct an increased amount of current which is proportional to the increase in the light intensity received at base 31. Collector 32 of phototransistor 15 is coupled to the voltage divider comprising resistors 21 and 22. Resistor 21 is coupled to input terminal 12 and resistor 22 is coupled to ground. Also, base 31 of phototransistor 15 is coupled to emitter 33.

The emitter 33 of phototransistor 15 is coupled to ground by the series combination of resistor 23 and variable resistor 17. The voltage drop produced across resistors 23 and 17 by the emitter current of phototransistor 15 causes an intermediate control signal to be developed at junction 34. Phototransistor 15 is coupled to the control means 16 by resistor 20 to impress the intermediate control signal on control means 16.

Control means 16 comprises a transistor having base 35, emitter 36 and collector 37. Base 35 is coupled to the phototransistor by resistor 20, emitter 36 is coupled to common potential being ground, and collector 37 is coupled to the Darlington pair switching means 13 at base 38 of transistor 24. Collector 37 is also coupled to input terminal 12 by resistor 18. Resistor 19 is coupled between collectors 29 and 30 of transistors 25 and 24 respectively and base 35 of transistor 16 to provide positive feedback between the Darlington pair transistors and control means transistor 16.

In operation, when the illuminating power is first applied to input terminals 11 and 12 the Darlington pair transistors will be saturated and thus apply all of the illumination voltage minus the drop across the Darlington pair to the control lamp 10 and the second incandescent lamp 14. When the applied illumination voltage reaches a level sufficient to cause incandescent lamp 14 to obtain a light output intensity sufficient to signify that the controlled lamp light output is of the desired intensity, the phototransistor 15 will conduct enough current to cause the intermediate control voltage on base 35 of control transistor 16 to be greater than the voltage required to forward bias transistor 16. As a result, transistor 16 will conduct causing the Darlington pair transistors to turn off. Thus, the voltage required to forward bias transistor 16 may be referred to as a reference voltage. In essence, transistor 16 acts as a comparator and compares the intermediate control voltage developed by the phototransistor 15 and the voltage required to bias it in order to control the Darlington pair transistors.

When the Darlington pair transistors turn off, the illumination energy to controlled lamp 10 and the second incandescent lamp 14 is terminated resulting in a decay in the intensity of their respective light outputs. When the light output of the second lamp 14 decays to a level which causes the intermediate control voltage to be less than the voltage required to forward bias transistor 16, transistor 16 will turn off and the Darlington pair in response will turn on thus restoring the illumination power to the controlled lamp 10 and the second incandescent lamp 14.

Resistor 19 is coupled between the collectors 29 and 30 and base 35 and provides positive feedback. As a result, the combination of the control transistor 16 and the Darlington pair transistors 24 and 25 comprise a Schmitt trigger having a variable time period. The time period is determined by the delay rate of the intensities of lamps 10 and 14 and the duty cycle is dependant on the amplitude of the illuminating power voltage.

Because sampling lamp 14 and the controlled lamp 10 are both incandescent lamps, each integrates the illumination energy in the same manner. Although their respective light output intensities may not be the same, the relative change in their respective light output intensities due to variations in the applied illumination power are identical. As the illumination power at input terminals 11 and 12 increases, the intermediate control voltage provided by the sampling lamp 14 and phototransistor 15 will cause the control transistor 16 to turn on the Darlington pair for shorter amounts of time than when the illumination power at the input terminals decreases. In this manner, it can be seen that the control circuit of FIG. 1 maintains the light output intensity of controlled lamp 10 constant notwithstanding variations in the illumination power at input terminals 11 and 12.

Figure 2:
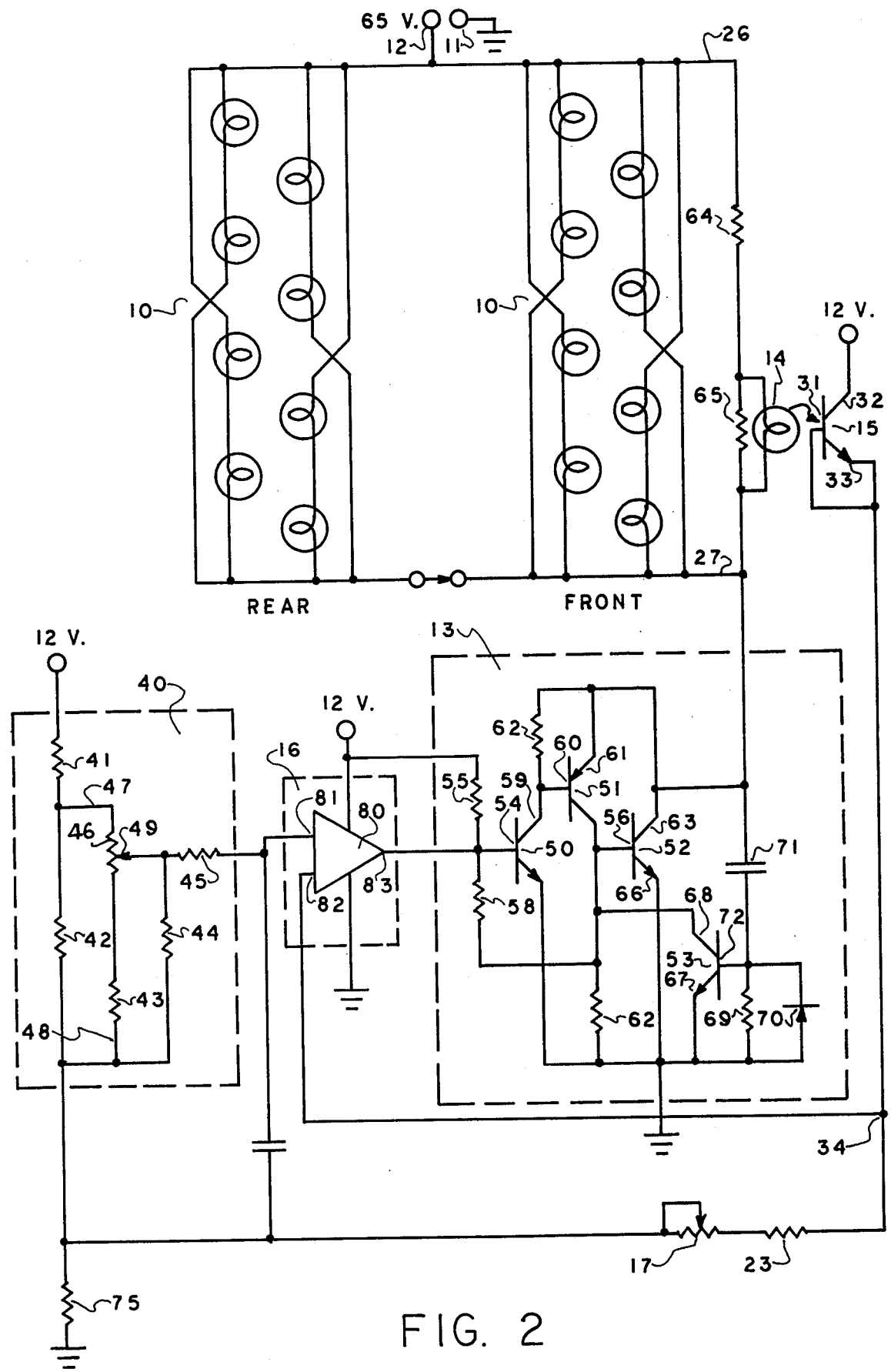
FIG. 2 is a circuit diagram of another embodiment of the lamp control circuit of the present invention.

Referring now to FIG. 2, lamp control circuit thereshown embodies further aspects of the present invention and is particularly suited for maintaining the light output of the lamp banks 10 of a document recorder constant. Reference numerals have been duplicated in FIG. 2 for those elements which find correspondence in the lamp control circuit of FIG. 1.

The lamp control circuit of FIG. 2 comprises input terminals 11 and 12, switching means 13, illumination power sampling means comprising incandescent lamp 14, light sensitive detector phototransistor 15, control means 16, and a reference voltage generating means 40. The lamp control circuit of FIG. 2 also includes fixed resistor 23 and variable resistor 17 which are utilized for developing the intermediate control voltage in conjuncation with phototransitor 15 in the same manner as described in relation to FIG. 1.

Lamp banks 10 which are to be controlled comprise a plurality of individual incandescent lamps. Input terminal 12 is coupled to one side 26 of the lamp banks and the other side of the lamp banks 27 is coupled to switching means 13. Switching means 13 is coupled to ground so that when the switching means is closed illumination power is applied to the lamp banks 10 and when the switching means is open the illumination power to the lamp banks is terminated. As indicated, the illumination voltage at input terminal 12 is unregulated 65 volts DC.

Switching means 13 comprises transistors 50, 51, 52 and 53 all of which turn on together 51, turn off together. Base 54 of transistor 50 is coupled to a 12 volt power supply by resistor 55 and to base 56 of transistor 52 and collector 57 of transistor 51 by resistor 58. The collector 59 of transistor 50 is coupled to base 60 of transistor 51 and to the emitter 61 of transistor 51 and to one side of the sampling lamp 14 by resistor 62. Emitter 61 of transistor 51 is also coupled to one side of the sampling lamp 14 and collector 57 is coupled to base 56 of transistor 52 and to ground by resistor 62. Base 56 of transistor 52 is also coupled to ground by resistor 62. Collector 63 of transistor 52 is coupled to the lamp banks by resistor 64 and 65 to thus couple the switching means 13 to the lamp banks 10. Also, resistors 64 and 65 serve as a voltage divider for sampling lamp 14. Emitter 66 of transistor 52 is coupled to ground to thus connect the switching means to input terminal 11 which is also connected to ground. Transistor 53 has an emitter 67 coupled to ground, a collector 68 coupled to the collector 57 of transistor 51 and the base 56 of transistor 52. Base 72 of transistor 53 is coupled to ground by resistor 69 which is in parallel with diode 70. Lastly, capacitor 71 couples base 68 of transistor 53 to collector 63 of transistor 52.

As previously mentioned, all of the switching means transistors 50 through 53 turn on and turn off together. Thus, when transistor 50 is forward biased it in turn causes transistors 51 to conduct which in turn causes transistor 52 to conduct also causing transistor 53 to conduct. When transistor 50 is back biased it in turn causes transistors 51, 52 and 53 to turn off together. Transistor 53 is provided to speed up the switching time of transistor 52 which conducts the main part of the illumination power applied to the sampling lamp 14 and the lamp banks 10.

As in the embodiment of FIG. 1, the light sensitive detector comprises a phototransistor 15 which develops an intermediate control voltage at junction 34 which acts upon control means 16. Phototransistor 15 includes a collector 32 coupled to a 12 volt power supply and an emitter 33 which is coupled to junction 34 which is in turn coupled to ground by resistors 23, 17 and 75. As in the embodiment of FIG. 1, when the light output intensity of sampling lamp 14 increases, the intermediate control voltage developed by phototransistor 15 increases and conversely when light output intensity of sampling lamp 14 decreases the intermediate control voltage decreases.

The reference voltage generating means comprises fixed resistors 41, 42, 43, 44, 45 and variable resistor 46. Resistor 43 is coupled in series with variable resistor 46 and resistor 42 is coupled across the two end terminals 47 and 48 of the variable resistor thereby produced. Resistor 41 is coupled between a 12 volt power supply and the common junction of resistors 42 and 46. Resistor 42 is also coupled to resistor 75. As a result of this combination, resistor 42 renders the maximum and minimum reference voltages accurately selectable while resistor 43 sets the lower limit of the reference voltage. Resistor 45 which is coupled to wiper terminal 49 of variable resistor 46 is also coupled to the control means and serves as an isolation resistor.

The control means 16 comprises comparator 80 which has a first input 81 coupled to the reference voltage generating means by resistor 45 and a second input 82 coupled to junction 34 for receiving the intermediate control voltage. Comparator 80 also has an output 83 which is coupled directly to base 34 of transistor 50 of switching means 13. Resistor 75 is provided to set the zero reference level of comparator at approximately three volts.

In operation, comparator 80 compares the reference voltage at input 81 to the intermediate control voltage at input 82. When the light output intensity of sampling lamp 14 is such that the intermediate control voltage is less than the reference voltage, thus indicating that the illumination power must be applied to sampling lamp 14 and lamp banks 10 to increase the light output intensity of lamp banks 10, comparator 80 will develop at its output 83 a high logic level signal. This forward biases transistor 50 to turn on the switching means for applying the illumination power at input 11 and 12 to the lamp banks 10 and sampling lamp 14. Conversely, when the intermediate control voltage at input 82 is greater than the reference voltage at input 81 indicating that the light output intensity of lamp banks 10 is too high, comparator 80 will develop at output 83 a low logic level. This will cause the switching means to turn off and to terminate the application of the illuminating power to the lamp banks 10 and sampling lamp 14. In this manner, the light output intensity of lamp banks 10 is rendered constant.

Variable resistor 46 provides at wiper terminal 49 a selectable reference voltage as wiper 49 is caused to sweep across resistor 46 so that the light output intensity of the lamp banks may be selectable. However, the selected light output intensity will remain constant in the manner previously described.

Resistor 17 is a variable resistor and is provided for compensating for various manufacturing tolerance such as differences in spacing between the sampling lamp 14 and the base 31 of phototransistor 15, light output characteristics in individual sampling lamps, and the current output characteristics of phototransistors, all of which commonly vary in manufacturing environments.

The present invention therefore provides a new and improved lamp control circuit which negates the necessity of including bulky and heavy inductance-capacitance combinations to filter the output voltage of a switching type regulator and also for integrating the illumination energy. The illumination energy is integrated by the sampling lamp 14 of the embodiments of FIGS. 1 and 2 instead. Also, because both the lamps to be controlled and the sampling lamps are incandescent, they integrate the illumination energy in the same manner thus assuring that light output intensity of the controlled lamps is being accurately monitored.

Particular embodiments of the invention have been shown and described, modifications may be made, and it is intended in the appended claims to cover all such modifications that may fall within the true spirit and scope of the invention.

What is claimed is:

1. A lamp control circuit for maintaining the light output intensity of an incandescent lamp to be controlled constant comprising:
   a pair of input terminals adapted for connection to an illuminating power source, one of said input terminals being coupled to one side of the incandescent lamp to be controlled;
   switching means coupled to the other side of the controlled lamp and to the other input terminal so that when said switching means is closed the illuminating power from said power source is applied to the controlled lamp and when said switch is open the illuminating power to the controlled lamp is terminated;
   illumination power sampling means comprising a second incandescent lamp coupled between said one input terminal and said switching means for sampling the illumination power and converting the sampled illumination power to light energy having an intensity related to the amount of illuminating power received by the controlled lamp;
   a light sensitive detector operatively coupled to said second incandescent lamp for providing an intermediate control signal directly related to said second incandescent lamp light intensity;
   reference voltage generating means for generating a reference voltage; and
   control means coupled to said light sensitive detector, said reference voltage generating means and to said switching means for causing said switching means to close for an interval dependent on the magnitude of the illumination power source when said intermediate control voltage is less than said reference voltage and for causing said switching means to open for an interval dependent on the response time of the second lamp when said intermediate control voltage is greater than said reference voltage to thereby render the light output intensity of the controlled incandescent lamp substantially constant.

2. A lamp control circuit for maintaining the light output intensity of an incandescent lamp to be controlled constant comprising:
   a pair of input terminals adapted for connection to an illumination power source, one of said input terminals being coupled to one side of the incandescent lamp to be controlled;
   switching means coupled to the other side of the controlled lamp and to the other terminal so that when said switching means is closed the illuminating power from said power source is applied to the controlled lamp and when said switch is open the illuminating power to the controlled lamp is terminated;
   illumination power sampling means comprising a second incandescent lamp coupled between said one input terminal and said switching means for sampling the illumination power and converting the sampled illumination power to light energy having an intensity related to the amount of illuminating power received by the controlled lamp;
   a light sensitive detector associated with said second incandescent lamp for providing an intermediate control signal responsive to said second incandescent lamp light intensity; and
   control means responsive to the intermediate control signal and coupled to said switching means for causing said switching means to open and close responsive to said intermediate control signal, said control means and said switching means being coupled together in a feedback loop between said second lamp and the other input terminal such that said switching means has variable open and closed intervals whose durations depend on the response time of the second lamp and the amplitude of the illumination power source, whereby
   as said second lamp light output intensity increases in response to increased illumination power, said detector and said control means cause said switching means to open and as said second lamp light output intensity decreases in response to decreased illumination power, said detector and said control means cause said switch to close to thereby maintain the light output intensity of said controlled lamp substantially constant.

3. A lamp control circuit in accordance with claim 2 wherein said light sensitive detector comprises a phototransistor.

4. A lamp control circuit in accordance with claim 2 wherein said switching means comprises first and second transistor coupled together in a Darlington pair configuration.

5. A lamp control circuit in accordance with claim 2 further comprising reference voltage generating means associated with said control means for generating a reference voltage, and wherein said control means causes said switch to close when the magnitude of said intermediate control signal is less than said reference voltage and to open when said intermediate control voltage is greater than said reference voltage.

6. A lamp control circuit in accordance with claim 2 wherein said control means comprises a transistor having a base, an emitter, and a collector, said base being coupled to said light sensitive detector, said emitter being coupled to a common potential, and said collector being coupled to said switching means, and wherein said reference potential is the potential required to forward bias said control means transistor.

7. A lamp control circuit in accordance with claim 6 wherein said switching means comprises a pair of transistors coupled together in a Darlington pair configuration and further comprising a positive feedback coupling means between said Darlington pair and said control means transistor.

8. A lamp control circuit in accordance with claim 5 wherein said control means comprises a comparator having first and second inputs and an output, said first input being coupled to said reference voltage generating means, said second input being coupled to said light sensitive detector, and said output being coupled to said switching means.

9. A lamp control circuit in accordance with claim 8 wherein said reference voltage generating means is variable to thereby render the constant light output intensity of said controlled lamp selectable.

10. A lamp control circuit in accordance with claim 9 wherein said variable reference voltage generating means comprises a fixed impedance and variable resistor having a pair of end terminals and a wiper terminal and wherein said fixed impedance is coupled across said end terminals to thereby render the maximum and minimum reference voltage accurately selectable and wherein said wiper terminal is coupled to said first input of said comparator.

* * * * *